INVENTOR
LAWRENCE L. MEYER
BY John E. Vandigriff
ATTORNEY

United States Patent Office 3,440,389
Patented Apr. 22, 1969

3,440,389
BONDING MACHINE

Lawrence L. Meyer, Houston, Tex., assignor to Texas Instruments Incorporated, Dallas, Tex., a corporation of Delaware Filed Feb. 1, 1966, Ser. No. 524,097
Int. Cl. B23k *1/02*
U.S. Cl. 219—85 4 Claims

ABSTRACT OF THE DISCLOSURE

Disclosed is an apparatus for controlling the energy applied to the electrodes of a bonding machine by monitoring the infrared radiation from the bonding area. This apparatus comprises an infrared detector, a tuning fork means for chopping and directing the infrared radiation from the bonding area to the detector and means responsive to the output of the detector to control the amount of energy applied to the electrodes of the bonding machine.

This invention relates to bonding machines and more particularly to a soldering machine having an infrared control system.

In the manufacturing of electronic assemblies using printed circuit boards, integrated circuits or other assemblies using many interconnecting wires and components, the bonding of the numerous lead wires is usually accomplished by soldering with a soldering tool and applying solder to the joint. As circuits become more delicate and compact, it is necessary to reduce the size of the soldering tool and more accurately control the quantity of heat applied to the joint to cause the solder to flow. Excessive heat may cause damage to the assembly being soldered, or when the soldering is done on etched circuit boards which are made up of an insulating material having copper strips bonded thereto, excess heat may cause the strips to loosen and become detached from the board. When solder is fed by hand to the tool, care must be exercised to apply just the right quantity of solder. Too little solder will cause poor connections which may later become loose. Too much solder will cause some of it to flow between components or wiring strips and thus produce short circuits between the connections. When hand soldering instruments are used, the amount of heat applied to the connection will be determined by the length of time the hot soldering tip is applied to the joints to be bonded. Even the most careful operator will, at times, leave the hot soldering tip at the joint for too long a period and thus cause damage to the wires of the component.

It is therefore one object of this invention to provide a soldering instrument which will limit the temperature at the soldering joint.

It is another object of the invention to provide a soldering instrument to which solder is not applied to the connection by hand.

It is still another object of the invention to provide a soldering machine which detects the infrared radiation from the heat generated at the soldering joint and limits the quantity of heat to the amount required in soldering the connection.

One feature of the invention is an infrared detection system which detects infrared radiation emanating from the solder joint, and limits the amount of heat applied at the joint.

Other objects and features of the invention will become more readily understood from the following detailed description and appended claims when considered in conjunction with the accompanying drawings in which like reference numerals designate like parts throughout the figures thereof and in which:

FIGURE 6 is a schematic diagram of the oscillator circuit used to drive the tuning fork illustrated in FIGURE 4; while

Figure 1:
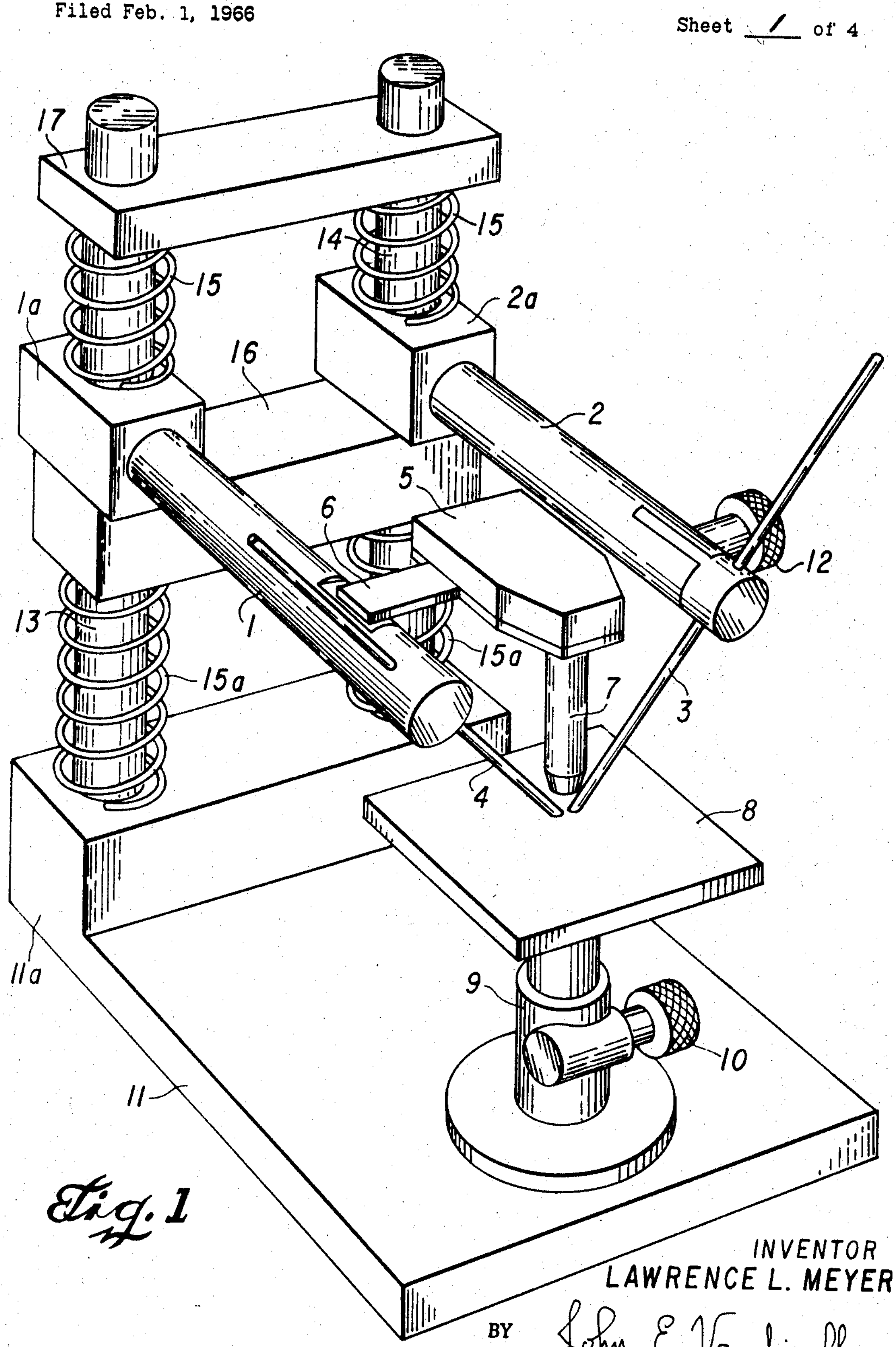
FIGURE 1 is a pictorial drawing of an infrared control soldering machine.

Referring now to the drawings, there is shown in FIGURE 1 a pictorial representation of the infrared control soldering machine. The soldering mechanism is comprised of two arms 1 and 2 each having soldering electrodes 4 and 3, respectively, extending therethrough. The electrodes are inserted through the arms so that they extend toward a common area but do not engage each other. The separation between the electrodes is made variable by moving electrode 3 laterally with control knob 12. The distance between tips of the electrodes during soldering is on the order of about 20 mils, but this distance may be varied to suit the work being done. Between arms 1 and 2 is a housing 5 which is attached to arm 1 by strap 6. Extending downward from the underside of the housing 5 is a hollow tubular member 7. The purpose of this member and housing will be explained in detail hereinafter.

Directly below the solder electrodes 3 and 4 is a platform 8 which is mounted on movable stand 9. The height of platform 8 may be adjusted by loosening the knob 10 to raise or lower platform 8 to position the work to be soldered underneath the electrodes. Work stand 9 rests upon base 11 of the soldering apparatus.

Arms 1 and 2 extend to the rear of the apparatus and are mounted in blocks **1*a* and 2*a*, respectively, which are slideably mounted on columns 13 and 14, respectively. Blocks 1*a* and 2*a* rest upon a crossbar 16 which is also slideably mounted upon the columns 13 and 14. Above the blocks 1*a* and 2*a* are springs 15, and below bar 16 are springs 15*a*. The top portions of columns 13 and 14 are attached to bar 17 which stabilizes and braces the columns at the top and retains the springs 15 upon the columns. Since arms 1 and 2 are used to pass the current to the electrodes 4 and 3, respectively, said arms must be insulated from each other. This may be accomplished by one of two means. The blocks 1*a* and 2*a* may be of an insulating material, or the two columns 13 and 14 may be insulated from each other by using insulating material for the bars 16 and 17 and the rear portion of 11*a* of base 11 into which the columns are mounted. The springs 15 and 15*a* are used to bias the arms and electrodes attached thereto above the work platform. By applying a downward force on bar 16, the electrodes 3 and 4 are brought into engagement with the parts (not shown) to be soldered, resting upon platform 8 underneath the electrodes. Upon removing the force, the electrodes will move up, clearing the soldered work and allowing the work to be moved to solder another area or removed to place another circuit board under the electrodes. The force may be applied by a foot mechanism (not illustrated) attached to the back of the machine, for example to bar 16, to pull downward on the bar, or bar 16** may be actuated with an electrically or hydraulically controlled mechanism.

Figure 2:
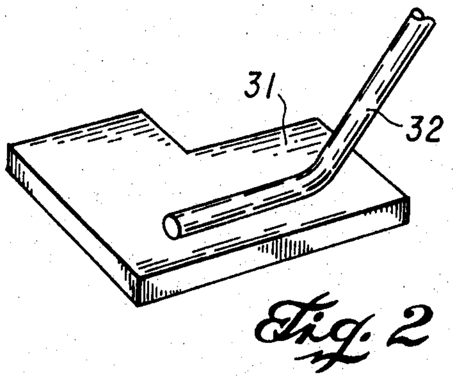
FIGURE 2 illustrates a lead bonded to a portion of a circuit board.

Referring now to FIGURE 2, there is shown a portion of a printed circuit board or semiconductor device with a lead wire attached thereto. Lead wire 32 is attached to a conducting area 31. Conducting area 31 may be a part of the copper laminate on a printed circuit board, may be a contact area on a semiconductor device, or even a contact area on an integrated circuit. Since the area 31 may vary greatly with the circuit board or device to which lead 32 is to be soldered, it is important that the temperature of the area to be soldered be controlled. For example, if area 31 is quite large compared to wire 32, area 31 would act as a heat sink, directing the heat away from the connection and causing insufficient heat to be applied to the wire 32, preventing the wire from being bonded to the area. If the area 31 is small compared with the lead 32, heat would not be conducted away from the area and over-heating might cause damage to the contact area or to the device upon which it is mounted. To facilitate bonding between the wire and the contact area, either the area 31 or the wire 32 is coated with a material which, when heated, will wet the surfaces to be joined. For example wire 32 or area 31 may be coated with a tin-lead alloy which, when heated, will solder the two parts together. Other such alloys and materials as gold, nickel or mixtures thereof may be used. The use of the above materials however, is not limited since any material which has a melting temperature within the range of the soldering machine may be used. It is important, however, that the electrodes 3 and 4, shown in FIG. 1, be of a material that will not stick to the alloys being used. Any suitable material may be used for the electrodes; however, it has been found that tungsten makes excellent electrodes since they do not stick to the soldering compounds and are best for high temperature applications.

Figure 3:
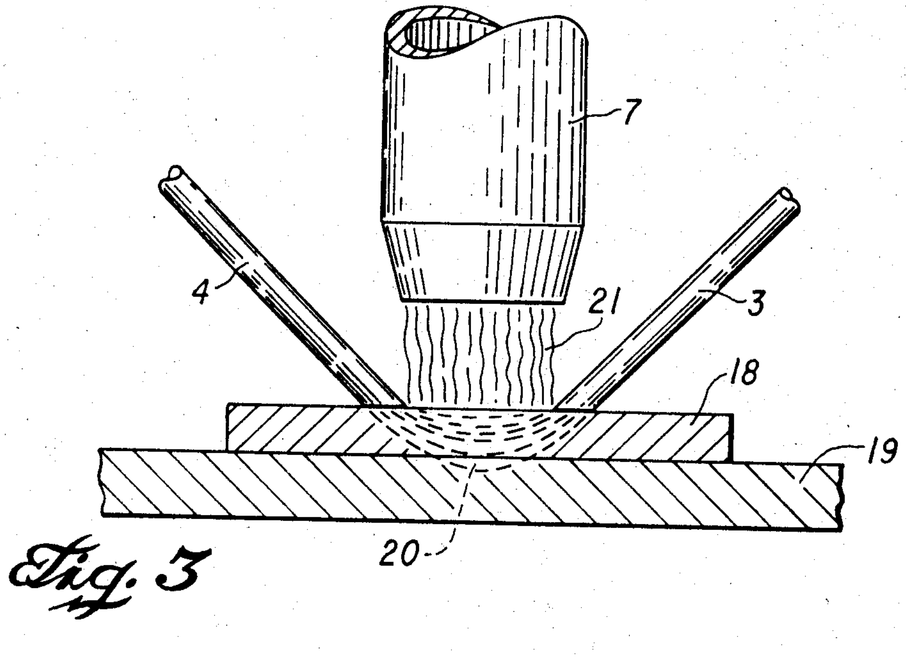
FIGURE 3 is a view of the electrodes of the machine soldering two parts together and showing the infrared pickup tube.

In the soldering operation, a voltage is applied across the arms 1 and 2 when the electrodes 3 and 4 are brought into engagement with the parts to be soldered. The pressure of the electrodes on the parts actuates a microswitch (not shown), applying voltage to the arms and permitting current to flow from one electrode to the other through the parts being soldered. In FIGURE 3, it is shown that the electrodes 3 and 4 are brought into engagement with part 18 which is to be soldered to part 19. Current will flow in the path shown by the dotted lines at 20. This current flow through the parts to be soldered heats up the parts, causing a coating of soldering material which has been applied either to the part 19, or the part 18 or both, to melt and bond the two parts together. When the parts heat up, infrared radiation emanates from the heated surface and passes through tube 7 into the housing 5, shown in FIGURE 1. Tube 7 is placed in close proximity to the work area so that only the infrared radiation emanating from the heated surface will be detected, radiation from other sources not being directed through the tube and thereby avoiding errors in the detected radiation.

Figure 4:
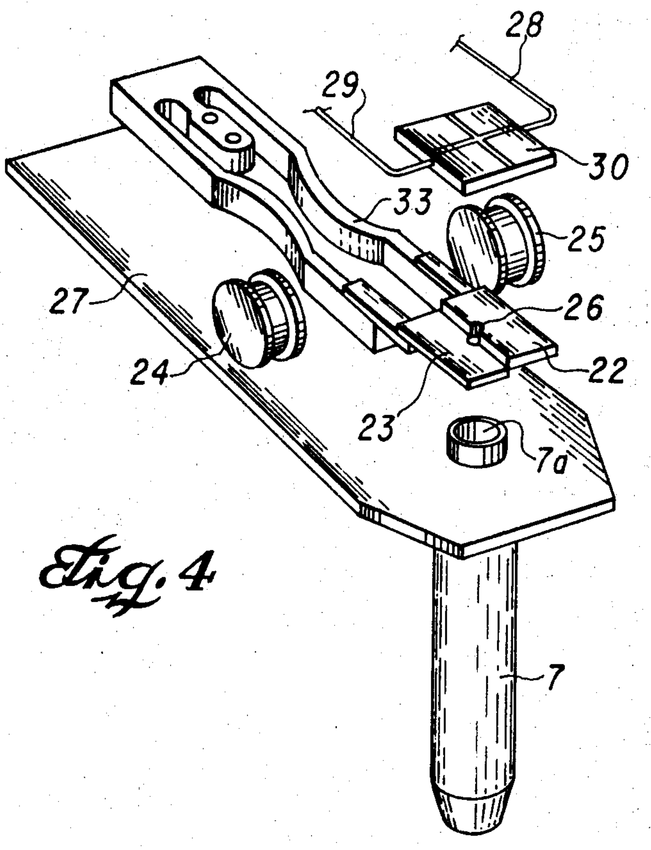
FIGURE 4 is an exploded partial view of an infrared detector and mechanical chopping means.

In FIGURE 4, an exploded pictorial view is shown of the mechanism within the sensor housing 5, shown in FIGURE 1. The radiation that passes through the tube 7 mounted on plate 27, enters into the housing from 7*a*. Adjacent the opening 7*a* are two vanes 22 and 23 having notches in their adjacent edges forming aperture 26 therein. When closed, the vanes overlap closing the aperture. Vanes 22 and 23 are mounted on a tuning fork 33. As the tuning fork vibrates, the movement of the vanes open and close the aperture so that the infrared radiation passing through the tube 7*a* is chopped and intermittently directed onto the infrared detector 30. Adjacent each leg of the tuning fork 33 are solenoid coils 24 and 25. A signal is impressed across one coil from, for example, an oscillator (shown in FIGURE 6) to set the tuning fork into motion. The other coil is used as a detector to pick up the tuning fork vibrations and supply a feedback signal to the oscillator to maintain oscillations. In this manner, the tuning fork 33 is caused to vibrate at a fixed frequency.

Figure 6:
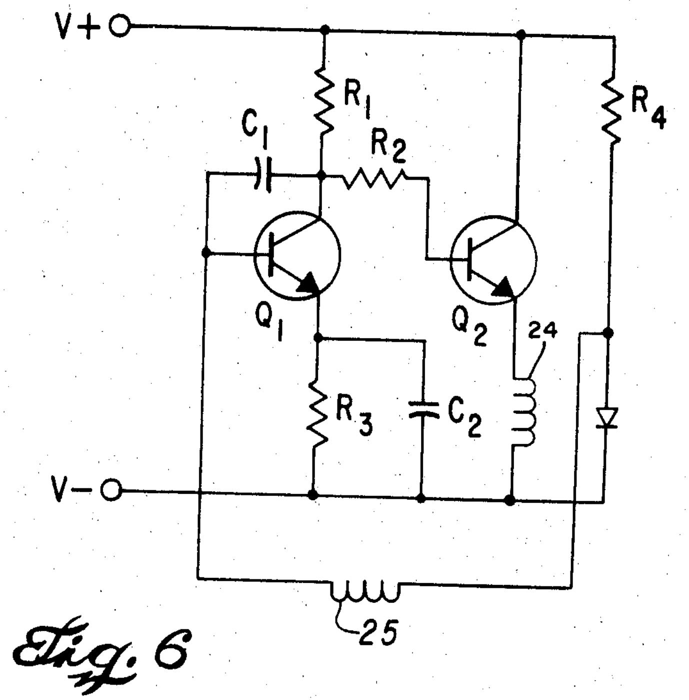

The oscillator circuit shown in FIGURE 6 is an example of a circuit which may be used in driving the tuning fork, causing it to vibrate at its natural frequency. The circuit comprises a two stage amplifier with feedback from the output to the input. The first stage is comprised of resistors R1 and R3, capacitor C1 and C2 and the transistor Q1. The first stage is coupled to a second stage by resistor R2. The second stage includes transistor Q2 and resistor R4. The coupling between the output of the amplifier and the input is a mechanical means, namely the tuning fork shown in FIGURE 4. When the circuit is turned on, noise within the circuit or movement of the fork will set this circuit into operation. For example, noise in the circuit will be amplified and applied to the tuning fork through coil 24 in the form of a magnetic field caused by current through the coil, setting the fork into motion. The motion of the fork is detected by coil 25, amplified by transistor amplifiers Q1 and Q2 and applied to the fork through coil 24. From this it may be observed that the more the fork vibrates the more movement that is detected by coil 25, amplified and reapplied to the tuning fork through coil 24. Through this feedback, the vibration of the tuning fork is maintained.

Any suitable tuning fork may be used, for example, such as one manufactured by Bulova Electronics Company, Model 8–TEX–20. This fork is referred to as a light chopper. The chopping of the infrared radiation impresses a varying signal onto the infrared detector which may be for example, an Infratron detector, type B3–SA1, manufactured by Infrared Industries Incorporated of Waltham, Mass. Suitable materials for the detector are for example, lead sulfide or lead selenide. The chopping rate of the tuning fork is not critical, but should not exceed the frequency response of the detector. The above named detector has a frequency response which starts dropping off after about 500 cycles per second. Therefore, a tuning fork which vibrates around about 450 cycles per second would be suitable. Attached to the infrared detector are leads 28 and 29 which go to a suitable control circuit (not shown) which will be explained hereinafter.

Figure 5:
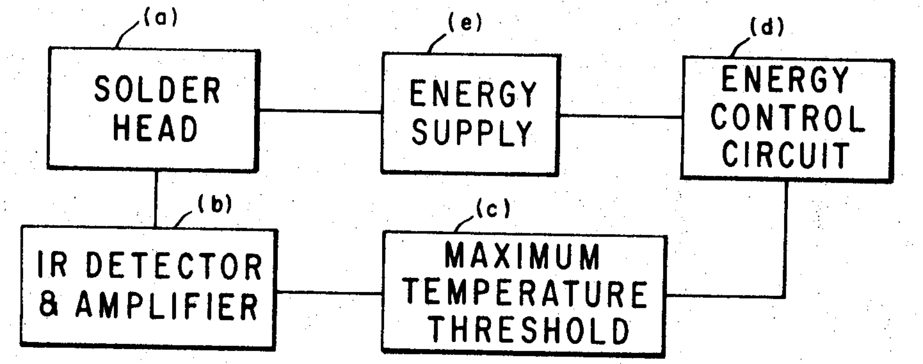
FIGURE 5 is a simplified block diagram of the solder machine and the associated control system.

The overall operation of the machine is illustrated by the simplified block diagram of FIGURE 5. Block *a* represents the solder head which is comprised of the arms and the electrodes. Block *b* is the infrared detector assembly.

Figure 7:
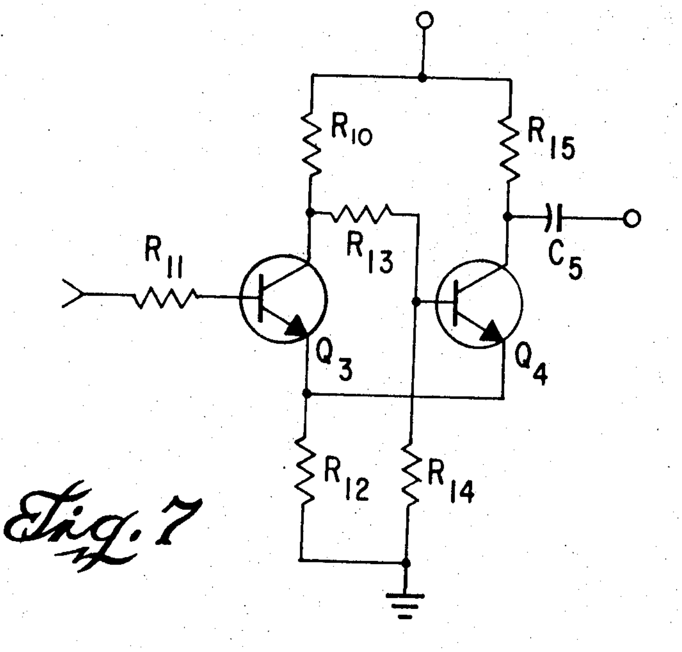
FIGURE 7 is a schematic diagram of a Schmitt trigger circuit used to detect when the infrared detector shown in FIGURE 4 exceeds a predetermined value.

The detector assembly includes the infrared detector 30 (FIGURE 4), the tuning fork light chopper and an amplifier (not shown) which receives the output from the detector and amplifies it to a usable level. Any A.C. amplifier is suitable which operates at the frequency of the tuning fork. The amplified signal from the amplifier is then directed to block *c*, the maximum temperature threshold detector, which examines the incoming signal to determine if it is above a predetermined level. The signal is related to the temperature of the solder head through the amount of radiation received. The maximum temperature threshold circuit may be for example, a Schmitt trigger circuit, as shown in FIGURE 7, which detects when the amplified signal from the amplifier exceeds a predetermined amount. This predetermined amount is representative of the maximum temperature desired at the solder area. When this occurs, a signal is sent to the energy control circuit block *b* which in turn will turn off the energy supply, block *e*, removing the power to the solder electrodes.

As mentioned above, the maximum temperature threshold circuit may be a Schmitt trigger circuit as shown in FIGURE 7. This circuit is one commonly used as a trigger circuit to deliver a stepped output from a continuously varying input, when the input exceeds a certain set level. In typical operation, the transistor stage made up of transistor Q3, resistors R10, R11 and R12 is biased into a nonconducting state. The second stage made up of transistor Q4 and resistor R15 is in a normally conducting state. When the signal applied at the input through R11 exceeds a certain predetermined level, determined by the bias on the transistor, transistor Q3 will be placed in a conducting state. The change in conduction will be coupled to transistor Q4 through the resistor network R13 and R14 thereby turning transistor Q4 off. This change of conducting state is reflected in the output and is coupled through capacitor C5 to the circuit being controlled. A more thorough explanation of the operation of this circuit may be found in Semiconductor Devices and Applications, by R. A. Grenier, pages 396–397, McGraw-Hill Book Company, Incorporated, 1961.

The energy control circuit (block *d*) may be of any configuration which will control voltage or current to the energy supply (block *e*), for example, semiconductor control rectifiers may control the input to the energy supply which may be, for example, a power transformer, stepping an applied voltage down to a value usable with the soldering electrodes. In practice, the energy supply may apply from 1 to 2½ volts across the soldering electrodes. Power is supplied to the electrodes for each soldering operation. When the parts being soldered reach a predetermined temperature, the power is removed from the electrodes preventing the temperature from exceeding a predetermined level. In this manner, the maximum temperature of the soldering head is controlled so that excessive heat will not be applied to the area to be soldered. Of course, the maximum temperature threshold is adjustable so that the limit may be set depending upon the parts to be soldered since some areas may need more heat than the others to accomplish the soldering of the connection.

Although the present invention has been shown and illustrated in terms of a specific preferred embodiment, it will be apparent that changes and modifications are possible without departing from the spirit and scope of the invention as defined in the appended claims.

I claim:

1. An apparatus for controlling the energy applied to a bonding machine by monitoring the infrared radiation from the bonding area comprising, an infrared detector mounted within a housing, a tuning fork having a vane mounted on each leg thereof, one of said vanes overlapping the other, an aperture formed by notches in the overlapping edges of said vanes, at least two electrical coils, one coil adjacent each leg of said tuning fork, one of said coils inducing vibrating motion to said tuning fork and another of said coils adjacent the other leg detecting vibration of the turning fork, a hollow tubular member passing infrared radiation from said bonding area into said housing, said vanes on said tuning fork periodically passing said radiation through the aperture in said vanes to said detector, and a control means responsive to the output of said detector for controlling the amount of energy applied to said bonding machine thereby regulating the temperature of said bonding area.

2. The apparatus as defined in claim 1 wherein said hollow tubular member is in close proximity to said bonding area and is positioned to pass infrared radiation emanating from said bonding area only.

3. An apparatus for controlling the energy applied to a bonding machine by monitoring the infrared radiation from the bonding area, comprising:

(a) an infrared detector, (b) means for passing infrared radiation from said bonding area to said detector, (c) means, including a tuning fork, intermediate said detector and passing means for chopping said infrared radiation, and (d) control means responsive to the output of said detector for controlling the amount of energy applied to said bonding machine thereby regulating the temperature of said bonding area.

4. The apparatus as defined in claim 3 wherein said means for passing is a hollow tubular member in close proximity to said bonding area and is positioned to pass infrared radiation emanating from said bonding area only.

References Cited

UNITED STATES PATENTS

| | | | |
|---|---|---|---|
| 2,817,747 | 12/1957 | Devonshire et al. ---- | 219—110 |
| 3,290,479 | 12/1966 | Avedissian ---------- | 219—85 |

RICHARD M. WOOD, *Primary Examiner.*

B. A. STEIN, *Assistant Examiner.*

U.S. Cl. X.R.

219—110